(12) United States Patent
Martin

(10) Patent No.: US 8,770,897 B2
(45) Date of Patent: *Jul. 8, 2014

(54) CORING TOOL ALIGNMENT ASSEMBLY

(75) Inventor: Frank P. Martin, Hillsboro, OR (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 868 days.

This patent is subject to a terminal disclaimer.

(21) Appl. No.: 12/612,027

(22) Filed: Nov. 4, 2009

(65) Prior Publication Data

US 2011/0103907 A1    May 5, 2011

(51) Int. Cl.
  *B23B 49/02* (2006.01)
  *B23B 47/28* (2006.01)

(52) U.S. Cl.
  USPC ............ 408/96; 408/80; 408/115 R; 408/204

(58) Field of Classification Search
  USPC ........... 408/72 B, 79, 80, 96, 97, 103, 115 B, 408/115 R, 204, 206, 703
  IPC .................................. B23B 47/28, 49/02, 51/04
  See application file for complete search history.

(56) References Cited

U.S. PATENT DOCUMENTS

| | | | | |
|---|---|---|---|---|
| 575,469 A | * | 1/1897 | Fancher | 408/115 R |
| 579,037 A | * | 3/1897 | Bulock et al. | 408/101 |
| 790,735 A | * | 5/1905 | Martin | 30/410 |
| 1,291,578 A | | 1/1919 | McPhail | |
| 1,341,067 A | * | 5/1920 | Naugle | 408/93 |
| 1,477,364 A | * | 12/1923 | Kettler | 408/237 |
| 2,039,009 A | | 4/1936 | Lampman | |
| 2,316,724 A | | 4/1943 | Sperry | |
| 2,484,150 A | * | 10/1949 | Brown | 408/204 |
| 2,543,909 A | | 3/1951 | Hatheway | |
| 2,670,635 A | * | 3/1954 | Evans | 408/103 |
| 2,777,341 A | * | 1/1957 | Marchant | 408/94 |
| 2,825,143 A | * | 3/1958 | Polivka | 33/520 |
| 2,853,904 A | * | 9/1958 | Bruce | 408/206 |

(Continued)

FOREIGN PATENT DOCUMENTS

| | | | | |
|---|---|---|---|---|
| DE | 3518496 A1 | * | 11/1986 | B23B 49/02 |
| JP | 63300808 A | * | 12/1988 | B23B 49/00 |

(Continued)

OTHER PUBLICATIONS

Inserta Fittings Co., Lateral Connections Solutions Inserta Tee, Brochure, 24 pages, Jan. 1, 2003.

*Primary Examiner* — Eric A Gates

(74) *Attorney, Agent, or Firm* — Finnegan Henderson Farabow Garrett & Dunner, L.L.P.

(57) ABSTRACT

A compact assembly for aligning a coring tool relative to a pipe sidewall. The coring tool includes a hollow, cylindrical hole saw mounted to an arbor that has an elongated pilot shaft centered in the hole saw. The assembly is made up of a base plate that is attachable to the pipe sidewall. In one embodiment, a tubular sleeve is mounted to the base plate and has a bore diameter sized for receiving the pilot shaft as the hole saw is advanced toward and saws through the pipe wall, and the entire assembly is sized to fit inside the hole saw as the hole saw saws through the pipe sidewall. In another embodiment, the base plate is configured for use with pipe sidewalls that include outwardly protruding ribs.

20 Claims, 7 Drawing Sheets

(56) References Cited

U.S. PATENT DOCUMENTS

| | | | |
|---|---|---|---|
| 2,881,643 A * | 4/1959 | Haade | 408/76 |
| 3,246,132 A | 4/1966 | Jordan | |
| 3,424,481 A | 1/1969 | Fulghum | |
| 3,663,042 A | 5/1972 | Fowler | |
| 3,922,107 A | 11/1975 | Fowler | |
| 4,203,692 A * | 5/1980 | Jensen | 408/96 |
| 4,365,829 A | 12/1982 | Fowler | |
| 4,422,812 A * | 12/1983 | Linville | 408/204 |
| 4,579,486 A * | 4/1986 | Damico | 408/204 |
| 4,706,999 A | 11/1987 | Hynes | |
| 4,755,088 A * | 7/1988 | Vajda | 408/68 |
| 4,759,459 A | 7/1988 | Bailey | |
| 5,111,858 A | 5/1992 | Aittama | |
| 5,129,684 A | 7/1992 | Lawrence | |
| 5,143,489 A * | 9/1992 | Bogner et al. | 408/1 R |
| 5,145,216 A | 9/1992 | Valls, Jr. | |
| 5,150,928 A | 9/1992 | Lodder | |
| 5,366,326 A * | 11/1994 | Converse | 408/72 B |
| 5,466,016 A | 11/1995 | Briody | |
| 5,743,682 A * | 4/1998 | Chaney, Sr. | 408/79 |
| 5,800,099 A * | 9/1998 | Cooper | 408/1 R |
| 5,826,919 A | 10/1998 | Bravo | |
| 5,871,310 A * | 2/1999 | Mortensen | 408/1 R |
| 6,048,141 A * | 4/2000 | Freeman | 408/201 |
| 6,050,753 A | 4/2000 | Turner | |
| 6,051,795 A | 4/2000 | Fisher | |
| 6,113,156 A | 9/2000 | Bea | |
| 6,224,115 B1 | 5/2001 | Blasch et al. | |
| 6,357,617 B1 | 3/2002 | Kido | |
| 6,409,437 B1 * | 6/2002 | Metzger | 408/80 |
| 6,508,490 B1 | 1/2003 | Hoffman | |
| 6,761,380 B2 | 7/2004 | Pachciarz | |
| 6,761,511 B2 * | 7/2004 | Turner | 408/92 |
| 7,055,867 B2 | 6/2006 | Faller | |
| 7,125,206 B2 | 10/2006 | Turner | |
| 7,131,796 B2 * | 11/2006 | Rooney | 408/115 R |
| 7,153,070 B1 * | 12/2006 | Schroeder | 408/115 R |
| 7,290,963 B2 * | 11/2007 | Hechtle et al. | 408/76 |
| 7,435,041 B1 * | 10/2008 | McGill | 408/92 |
| 7,438,509 B1 * | 10/2008 | Wong et al. | 408/67 |
| 7,513,718 B1 * | 4/2009 | Arnold | 408/1 R |
| 7,967,535 B2 * | 6/2011 | Eiserer et al. | 408/204 |
| 8,137,036 B2 * | 3/2012 | Wadley et al. | 408/1 R |
| 2007/0166116 A1 * | 7/2007 | Olson et al. | 408/204 |
| 2007/0181342 A1 | 8/2007 | Duncan | |
| 2008/0303270 A1 | 12/2008 | Kief | |

FOREIGN PATENT DOCUMENTS

| | | | | |
|---|---|---|---|---|
| JP | 01240211 A * | 9/1989 | | B23B 51/05 |
| JP | 2001009619 A * | 1/2001 | | B23B 51/12 |
| WO | WO 00/74884 A1 * | 12/2000 | | B23B 47/28 |

* cited by examiner

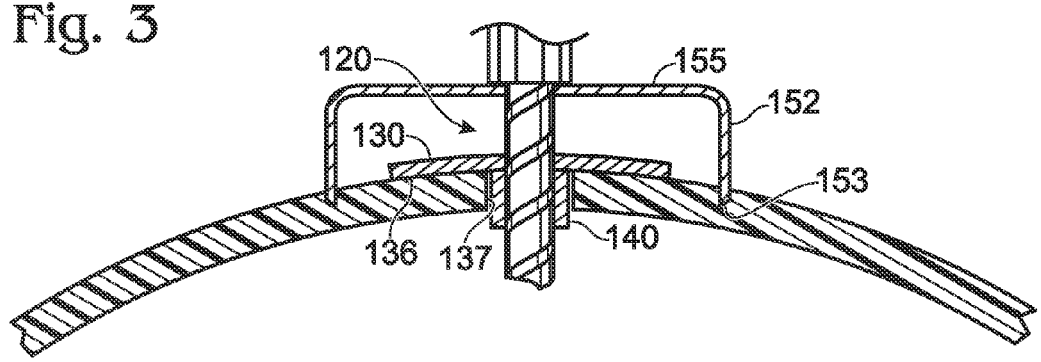
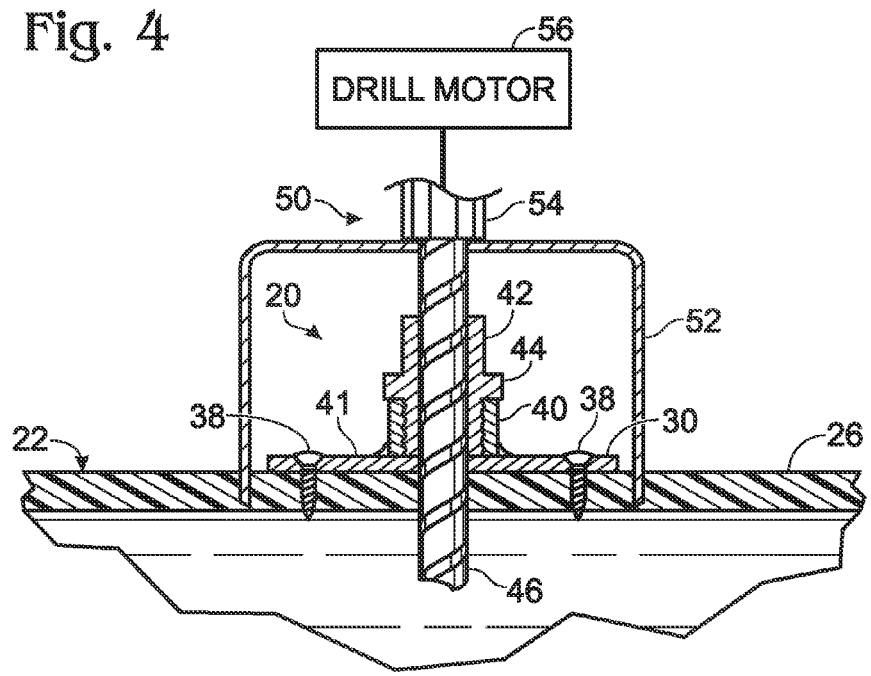
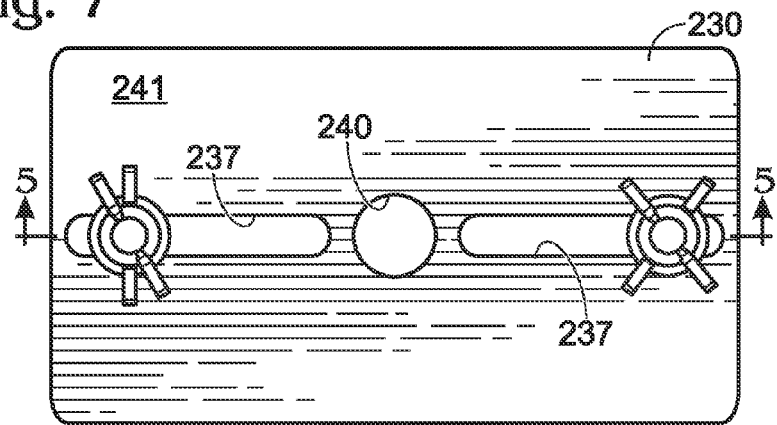

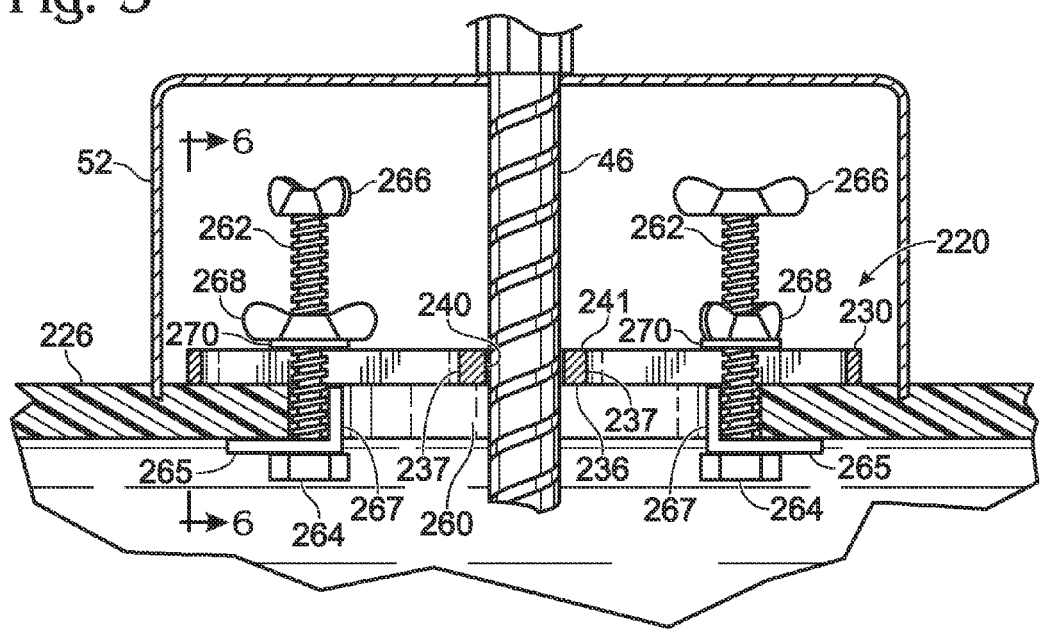
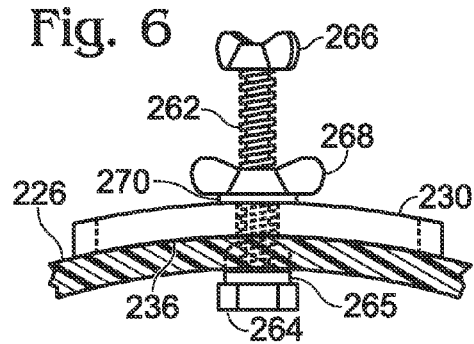
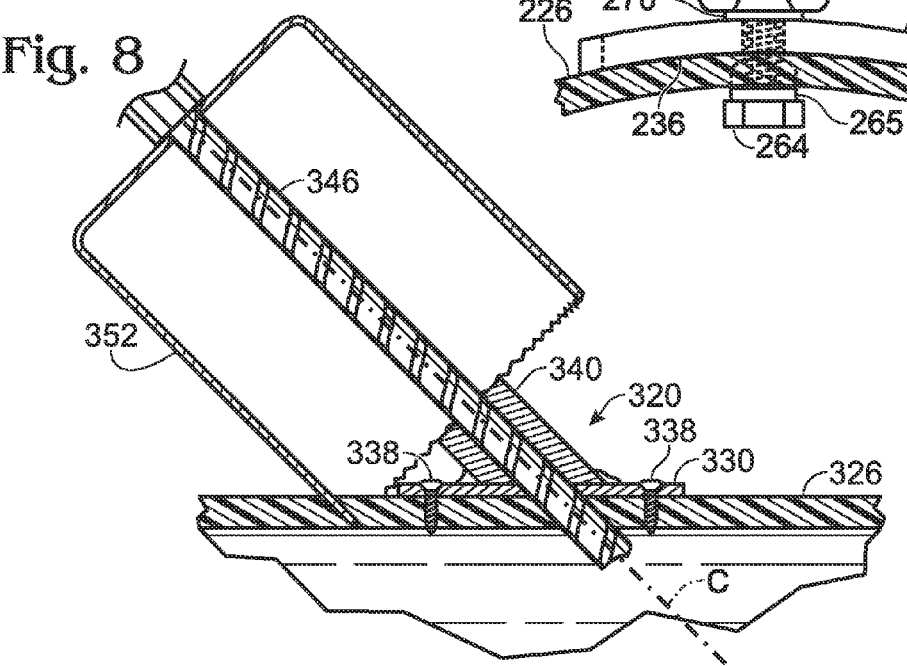

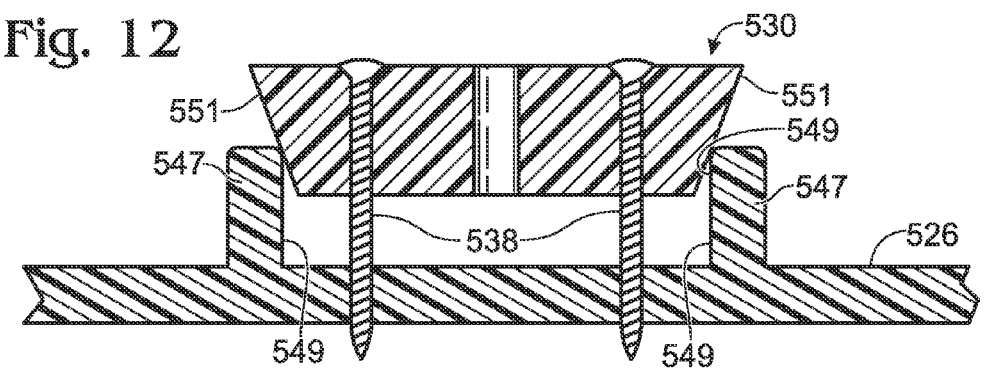
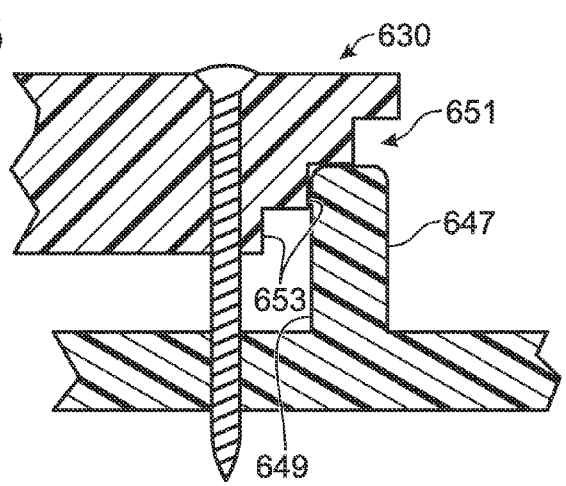
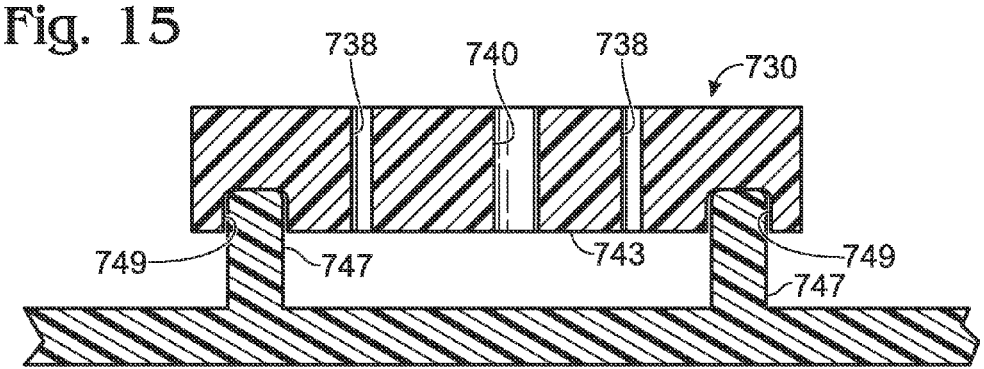

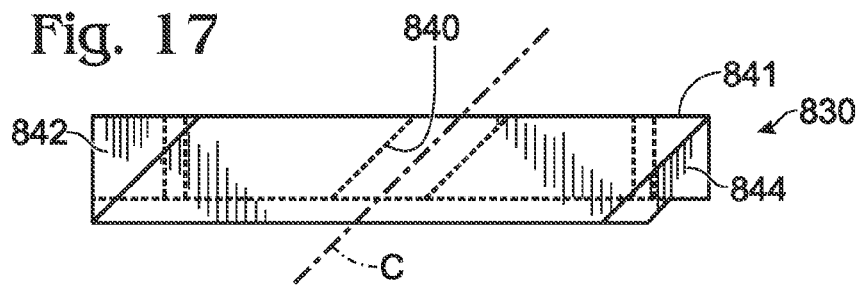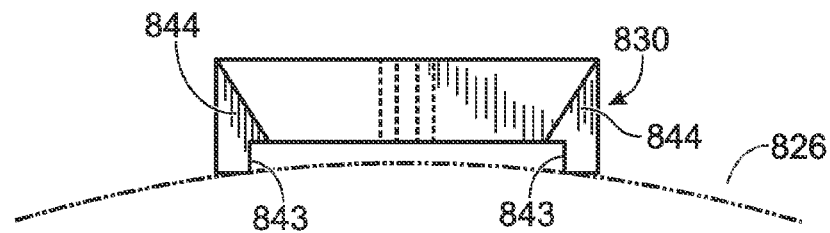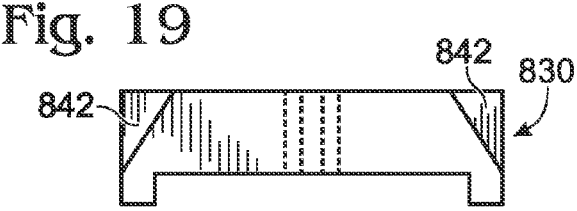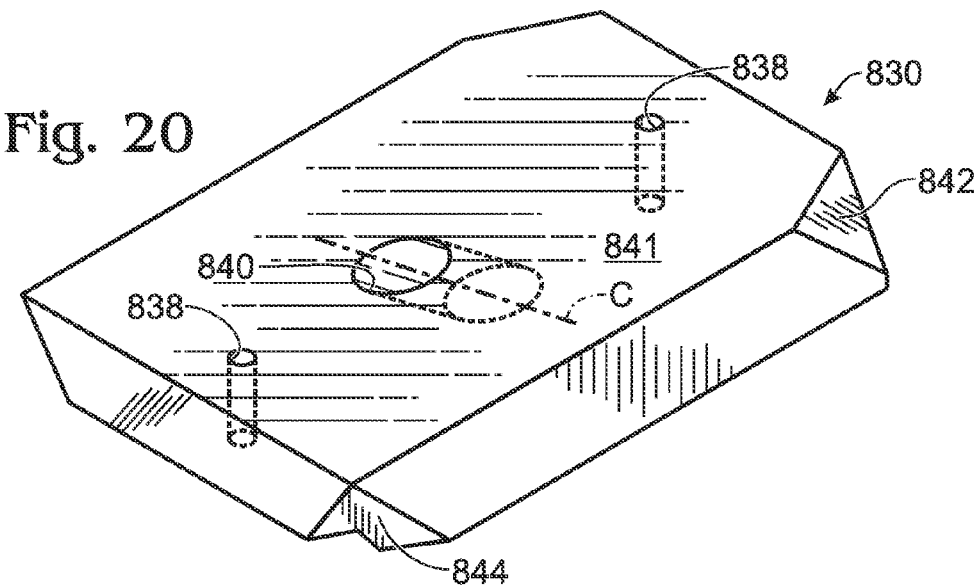

CORING TOOL ALIGNMENT ASSEMBLY

FIELD OF THE INVENTION

This invention generally pertains to what is known as a service connection between a mainline wastewater or storm water pipe and a lateral connecting pipe. More specifically, this invention relates to an assembly that facilitates precise formation of a hole through the sidewall of the mainline pipe for securely connecting the main and lateral pipes.

BACKGROUND AND SUMMARY OF THE INVENTION

Gravity-type pipe conveyance systems for waste or storm water generally include a mainline pipe or conduit to which service lateral pipes are connected. Many applications call for the connection of the lateral pipes to be made such that the lateral is perpendicular to the mainline pipe. Such service connections are often referred to as "Tee" connections. Alternatively, the service lateral pipe can be connected at an angle (although with the long axis of the lateral preferably always intersecting the long axis of the mainline pipe) and is thus designated, for example, as a "Wye" or 45-Degree service connection.

Service connections often require a hole to be cored through the sidewall of the mainline pipe. The diameter of the cored hole is made slightly larger than the diameter of the service lateral pipe, which has a smaller diameter than the mainline pipe.

One effective service connection system is available from Inserta Fittings Inc., the assignee of the present application (www.insertatee.com), and marketed under the trademark INSERTA FITTINGS. That system comprises a three-piece service connection that is compression fit, without special tooling, into the hole that is cored through the sidewall of a wastewater or storm water mainline pipe. The three-piece service connection comprises a substantially rigid, cylindrical, hollow hub; an elastomeric sleeve; and a stainless steel band. The sleeve fits into a cored hole in the mainline pipe. A leading end of the hub is forcibly inserted into the elastomeric sleeve. After the hub is inserted, a stainless steel band is fastened around the sleeve to secure together the sleeve and the hub. The exposed or trailing end of the hub can be shaped to define a conventional bell component of a bell and spigot joint, and receives the spigot end of the service lateral that is to be connected. This type of service connection may be used with any of a wide variety of pipe types (concrete, PVC, corrugated, ribbed, etc).

A coring tool is used for coring the requisite hole in the mainline pipe. A coring tool generally includes a hollow, cylindrical hole saw that is mounted to an arbor. The leading end of the arbor comprises a pilot shaft, normally configured as a drill bit, that is centered in the hole saw. The other end of the arbor is mounted to a drill motor or the like for powering rotation of the hole saw to cut through the pipe.

It is important that the coring tool is properly aligned with the mainline pipe to produce a hole that is correctly formed, such that the central axis of the hole intersects the central axis of the mainline pipe. Put another way, the coring tool must remain securely aligned as the hole saw is advanced through the pipe sidewall. If the tool and resulting hole are not properly aligned, the central axis of the hole will not intersect the long axis of the mainline pipe. Consequently, the misaligned hole made in the sidewall of the mainline pipe will be oblong rather than circular. This can result in attendant misalignment of the service connection with the mainline pipe, hence misalignment of the service lateral, which can lead to leaking and eventual structural failure of the connection.

It is possible for an installer to apply excessive axial force on the service lateral pipe when fitting the spigot end of that pipe into the connection hub. In such an instance, and especially where the cored hole is not quite circular, the excessive force may cause an undesirable amount of penetration of the sleeved end of the hub into the mainline pipe, which can result in interference with the operation and/or inspection of the mainline pipe.

There exists in the prior art complicated tools for engaging a mainline pipe to secure a platform or guide apparatus on a pipe for controlled movement of a connected coring device to form the hole in the pipe sidewall. Such complicated devices usually require many parts and are cumbersome, especially in an environment where a lateral connection is made to, for example, an existing main sewer line that has been exposed, in place, several feet underground. Usually, only a narrow trench is provided for a worker to access the main and make the connection. Moreover, in some construction environments, rainwater, mud, debris, and other elements may make it extremely difficult and/or time consuming for a worker to use conventional mechanisms for controlling coring tools to produce a properly formed hole.

The complexity of engaging a mainline pipe to secure a guide thereto for controlled movement of a connected coring device is increased when the mainline pipe includes outwardly protruding features such as spaced-apart ribs. Such ribs are sometimes attached or integrally formed with the pipe to enhance the pipe's resistance to crushing failure.

The present invention is directed to a compact and elegantly simplified assembly for aligning a coring tool to cut a precisely formed hole in a pipe sidewall. Embodiments are described for using the assembly with pipes having various sidewall surface features, including ribbed sidewalls. Other advantages and aspects of this invention will become clear upon review of the following description and drawings.

BRIEF DESCRIPTION OF THE DRAWINGS

FIG. 3 is a side, cross sectional view of the assembly, like FIG. 2, but showing an alternative embodiment of the assembly.

FIG. 4 is a side, cross sectional view of the assembly taken along lines 4-4 of FIG. 1 showing the hole saw component of the coring tool advancing through the pipe sidewall.

FIG. 5 is a side, cross sectional view of the assembly, like FIG. 4, but showing another alternative embodiment of the assembly that is particularly useful for enlarging a pre-existing hole in the pipe sidewall.

FIG. 6 is a side, cross sectional view taken along lines 6-6 of FIG. 5.

FIG. 7 is a top view of the assembly of FIG. 5, but with the coring tool removed.

FIG. 8 is a side, cross sectional view of the assembly, like FIG. 4, but showing another alternative embodiment of the assembly.

FIG. 12 is an end view, in cross section, of another alternative embodiment of a base plate component of the assembly.

FIG. 13 is an enlarged, detail view showing a possible modification of the base plate component of FIG. 12.

FIG. 15 is a section view taken along line 15-15 of FIG. 14.

FIG. 17 is a right side view of the base plate component of the embodiment of FIG. 16.

FIG. 18 is a front end view of the base plate component of the embodiment of FIG. 16.

FIG. 19 is a back end view of the base plate component of the embodiment of FIG. 16.

FIG. 20 is a perspective view of the base plate component of the embodiment of FIG. 16.

DETAILED DESCRIPTION OF PREFERRED EMBODIMENTS

Figure 1:
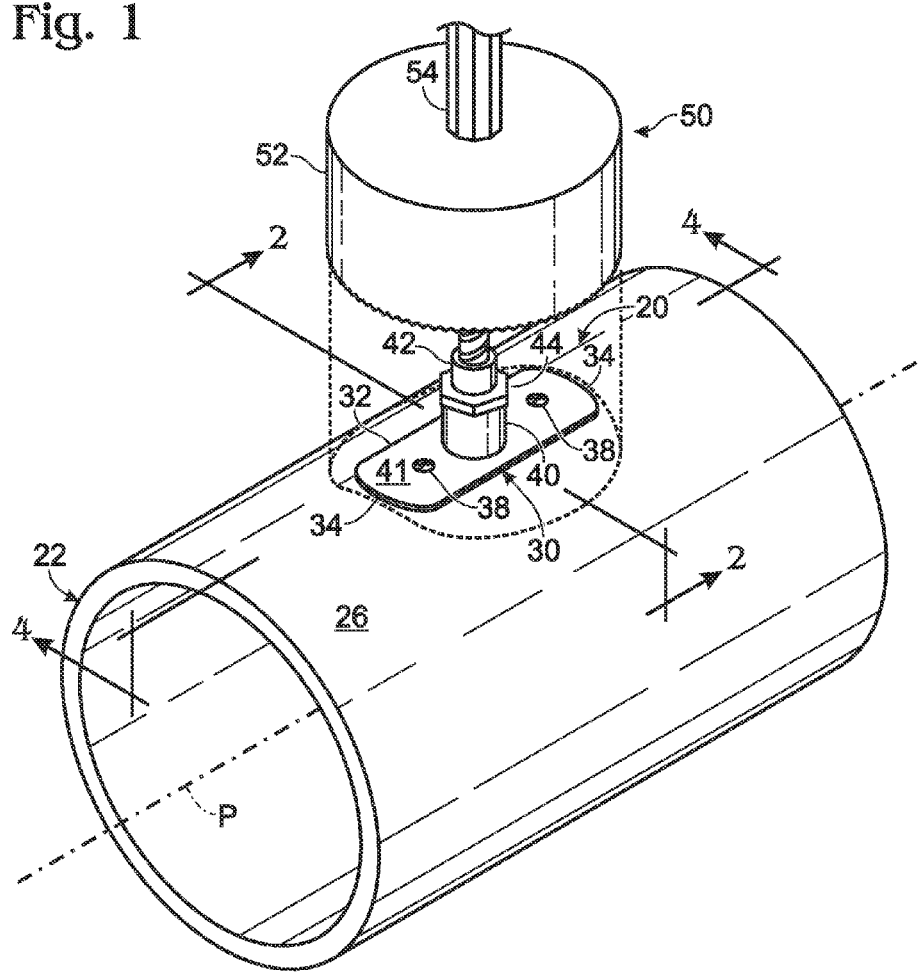
FIG. 1 is a perspective view of an assembly constructed in accordance with one embodiment of the invention and used for easily and precisely aligning a coring tool for forming a hole through the sidewall of a pipe.

One embodiment of an assembly 20 for aligning a coring tool relative to a pipe sidewall 26 is shown in FIG. 1 connected to the mainline pipe 22 as the hole saw 52 of a coring tool 50 is rotated and advanced toward the pipe 22 for cutting a hole in the sidewall 26 of the pipe.

Figure 2:
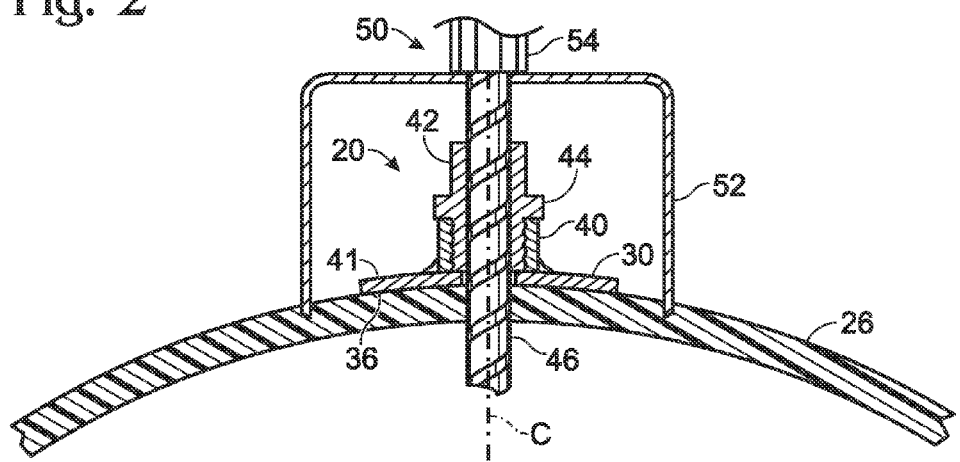
FIG. 2 is a side, cross sectional view of the assembly taken along lines 2-2 in FIG. 1 and showing the hole saw component of the coring tool advancing through the pipe sidewall.

With particular reference to FIGS. 1, 2, and 4, the alignment assembly includes a rigid base plate 30 having straight, parallel side edges 32 and rounded end edges 34. As best seen in FIG. 2, the base plate 30 is preferably shaped to conform to the curvature of the exterior of the pipe sidewall 26. Thus, for smooth-sided pipes, such as a PVC sewer pipe as depicted here, the underside 36 of the base plate 30 abuts the exterior of the pipe sidewall 26.

Although a smooth-walled pipe 22 is shown in the figures, it is contemplated that the present assembly is may be employed with corrugated, ribbed and other pipe sidewall shapes and surfaces as described more below.

In one embodiment, the base plate 30 may be secured to the pipe with fasteners, such as shown at 38 in FIGS. 1 and 4. The fasteners may be screws that pass through associated clearance apertures formed in the base plate 30. Alternatively, the fasteners 38 may be elongated studs or shanks that protrude from the underside 36 of the base plate to be press-fit into pre-drilled apertures made in the pipe sidewall.

A tubular sleeve 40 protrudes from the top surface 41 of the base plate 30. The tubular sleeve is fastened to or integrally formed with the base plate and, in this embodiment, arranged so that its central axis "C" (FIG. 2) will intersect the longitudinal central axis "P" (FIG. 1) of the pipe 22 to which the base plate 30 is fastened.

In this embodiment, the sleeve 40 includes a tubular coupling 42 that is externally threaded to mate with the internally threaded bore of the sleeve (FIG. 2). The coupling 42 includes a flange 44 with flats to enable the coupling to be engaged with a wrench for securely threading together the coupling 42 and the sleeve 40. The bore of the coupling 42 is preferably smooth to receive and guide the pilot shaft 46 (FIGS. 2 and 4) of a coring tool as described more fully below.

Preferably, the coupling 42 is interchangeable with other couplings that have smaller-diameter bores so that a variety of pilot shaft diameters can be readily accommodated by the alignment assembly 20. That is, the guiding action provided by the sleeve 40 and attached coupling 42 can be changed to match any of a variety of pilot shaft diameters found in conventional coring tools. Also, the technique for joining the coupling 42 and sleeve 40 need not be limited to threading. For example, suitable detent, set screw, or quick release mechanisms can be employed for facilitating the interchangeability of the couplings.

It will be appreciated that any of a variety of mechanisms may be employed for varying the bore diameter of the sleeve in addition to the interchangeable coupling just mentioned. Moreover, it is also contemplated that the bore of the sleeve 40 could be smooth to act as a guide for the pilot shaft 46 in the absence of any coupling component. Also, a few alignment assemblies can be provided, each with a particular sleeve bore diameter (for example, ¼ inch; ⅜ inch; ½ inch, etc.), clearly marked to enable a user to readily select the sleeve bore that matches the diameter of the pilot shaft of the particular coring tool in use.

With continued reference to FIGS. 1, 2, and 4, the coring tool 50 that is usable with the present invention generally includes a hollow, cylindrical hole saw 52 that is mounted to an arbor 54. The leading end of the arbor comprises the above-mentioned pilot shaft 46, which is normally configured as a drill bit and is centered in the hole saw 52. The other end of the arbor is mounted to the chuck of a hand-operated drill motor 56 or the like (shown schematically in FIG. 4) for powering rotation of the hole saw to cut through the pipe. The hand-held drill motor is not, and need not be, otherwise connected to pipe.

One technique for using the assembly of the present invention involves first fastening the base plate 30 to the pipe sidewall 26 as discussed above and shown in FIG. 1. As noted, no other pipe engaging mechanisms (chains, platforms etc) are required. The coring tool 50, attached to the drill motor 56, is then manipulated so that the pilot shaft or bit 46 is received in the bore of the coupling 42. The drill motor is operated to rotate the pilot shaft 46 and hole saw 52, and the hole saw is advanced toward the pipe sidewall 26 as the pilot shaft 46 is drilled through the pipe sidewall. (Alternatively, the pilot shaft would pass through a pre-drilled hole in the sidewall that matches and is axially aligned with the bore of sleeve coupling.)

The path of the advancing hole saw 52 is generally shown in dashed lines in FIG. 1. As can be seen there and in FIGS. 2 and 4, the base plate 30 is sized so that it will entirely fit inside of the hollow hole saw 52 as the hole saw saws through the pipe sidewall. The entire assembly, 20, therefore, fits inside of the hole saw 52. Moreover, as is typically the case, the removed core of the pipe sidewall (that is, the circular piece or "coupon" of the sidewall 26 that is freed by the hole saw 52) is temporarily lodged inside of the hole saw until forcibly removed. Consequently, the action of sawing the hole through the pipe sidewall also effectively disengages the entire alignment assembly 20 from the pipe 22 so that the assembly can be retrieved along with the cored part of the pipe. Put another way, once the hole saw operation is complete, the user need not disengage from the pipe any chains, platforms etc for removing the alignment assembly from the pipe before proceeding with making the lateral pipe connection.

FIG. 3 depicts an alternative embodiment of the invention for use in instances where a shallow hole saw 152 is used. That is, some hole saws 152 have a relatively short distance between the cutting edge 153 of the saw and its back wall 155, so that a sleeve protruding outwardly from the base plate 130 may prevent the saw from moving completely through the sidewall of the pipe. The embodiment of the alignment assembly 120 shown in FIG. 3 features an inwardly projecting sleeve 140 that protrudes from the underside 136 of the base plate 130 through a pilot aperture 137 formed in the pipe sidewall. It will be appreciated that this arrangement provides sufficient clearance for the advancing back wall 155 of the shallow hole saw 152 to permit the saw to cut entirely through the pipe sidewall 126. Finally, this embodiment (FIG. 3) illustrates use of the assembly 120 employing a smooth-bored sleeve 140 without a coupling, although a coupling could be employed as an alternative.

The assembly 20 depicted in FIG. 1 may also be used in instances where it is desirable to enlarge a previously cored hole in the pipe. For example, as best shown in FIG. 5, it may be desirable to enlarge a previously cored hole 260. Enlargement of the hole 260 may be desirable in instances where the originally cored diameter is simply too small. On the other hand, if the original hole 260 is the correct size but cored in a manner that caused it to be misaligned (that is, so that the central axis of the hole does not intersect the central axis of the pipe), the original hole can be enlarged with the assembly of the present invention so that a correctly aligned hole is produced. After enlargement, the lateral connection to the mainline can be made with the inclusion of a reducer fitting or the like for connecting the lateral pipe to the enlarged hole. In short, the use of the present invention for enlarging a misaligned hole eliminates the problem of patching the original hole or replacing the section of pipe in which the misaligned or undersized hole was made.

FIGS. 5-7 illustrate an embodiment of the alignment assembly 220 that can be used for enlarging the diameter of a previously formed hole 260. As shown there, the base plate 230 includes a central sleeve 240 for guiding a pilot shaft 46 as described above. In this embodiment, the base plate 230 is sufficiently thick to allow the sleeve 240 to be formed as an aperture through the cover plate without protruding therefrom. It is contemplated that a protruding sleeve with or without a coupling could be used in this embodiment, however. Moreover, it is also contemplated that the sleeve 40 in the base plate 30 of the previously described embodiments may also be formed solely from an aperture through the plate, and not protruding therefrom.

The base plate 230 of the FIGS. 5-7 embodiment includes a through slot 237 on each side of the sleeve 240. A bolt 262 with enlarged head 264 is passed through each slot 237 so that the head end of the bolt is disposed on the underside 236 of the base plate 230. A generally L-shaped (in side view, FIG. 5) large washer 265 is fixed to the bolt head 264 so that a leg 267 of the washer 265 protrudes from the bolt head toward the underside 236 of the base plate 230 (FIG. 5). Preferably, the protruding length of the leg 267 is about the same as or slightly less than the thickness of the pipe sidewall 226.

The opposite end of each bolt 262 carries a wing nut 266 that is welded or otherwise fixed thereto. A free wing nut 268 and washer 270 are carried on the bolt shaft between the fixed wing nut 266 and the top surface 241 of the cover plate 230.

To use the alignment assembly 220 for enlarging an existing hole 260, the bolts 262 are moved through the corresponding slots 237 toward the center of the cover plate 230 by an amount such that the head ends 264 of each bolt will be free to extend through the existing hole 260. Next, the bolts 262 are slid apart until they each are adjacent the portion of the pipe sidewall that defines the edge of the existing hole 260. The head 264 and washer 265 are then drawn upwardly (FIG. 5) into engagement with edge of the hole, and the free wing nut 268 and washer 270 are firmly threaded against the top surface 241 of the cover plate 230, thereby effectively clamping the base plate 230 to the pipe sidewall and spanning the existing hole 260. The hole saw 52 is then driven as described above to cut through the pipe and form the enlarged hole.

It will be appreciated that the earlier described embodiments depicted in FIGS. 1-4 can also be used to enlarge a previously cored hole in the pipe sidewall, thus eliminating the need for the clamping mechanisms just described.

As noted above, many applications call for the connection of the lateral pipes to be made such that the lateral is perpendicular to the mainline pipe. Alternatively, the service lateral pipe can be connected at an angle (although with the long axis of the lateral pipe intersecting the long axis of the mainline pipe) and is thus designated, for example, as a "Wye" or 45-Degree service connection. FIG. 8 illustrates an alternative embodiment of the present invention that is adapted to facilitate formation of a precisely aligned hole in the pipe sidewall 326 where the lateral connection is to be inclined at an angle relative to the mainline pipe. In this embodiment, the assembly 320 includes a base plate 330 generally as described above in connection with earlier embodiments, but incorporating a sleeve 340 arranged so that the central axis "C" of the sleeve bore is inclined by the desired angle (for example 45 degrees) of intersection between the lateral and mainline pipe.

Once secured in place (as by fasteners 338) the pilot shaft or bit 346 of the coring tool is received in the bore of the sleeve 340. The drill motor (not shown) is operated to rotate the pilot shaft and hole saw 352, and the hole saw is advanced toward the pipe sidewall 326 as the pilot shaft is drilled through the pipe sidewall. The hole saw 352 is advanced by an amount sufficient to complete cut through the pipe and thereby forming a hole therein that is aligned with the center line "C" of the sleeve bore and intersecting the centerline of the pipe. As noted above, the size of the assembly 320 is such that it will be completely contained within the hole saw that is advanced through the pipe sidewall.

Figure 9:
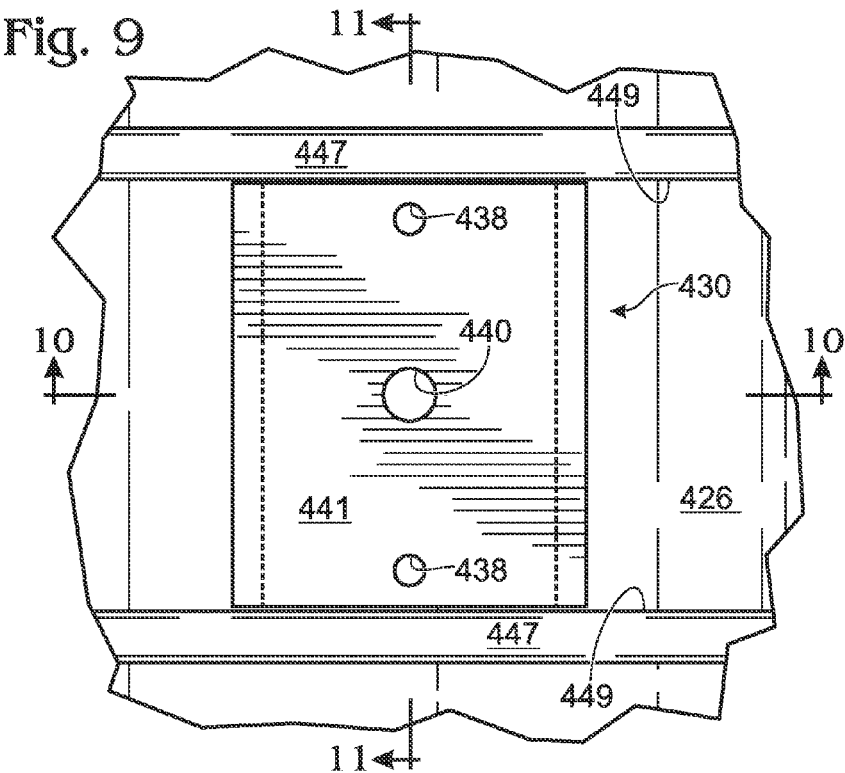
FIG. 9 is a top view of another alternative embodiment of a base plate component of the assembly.
Figure 10:
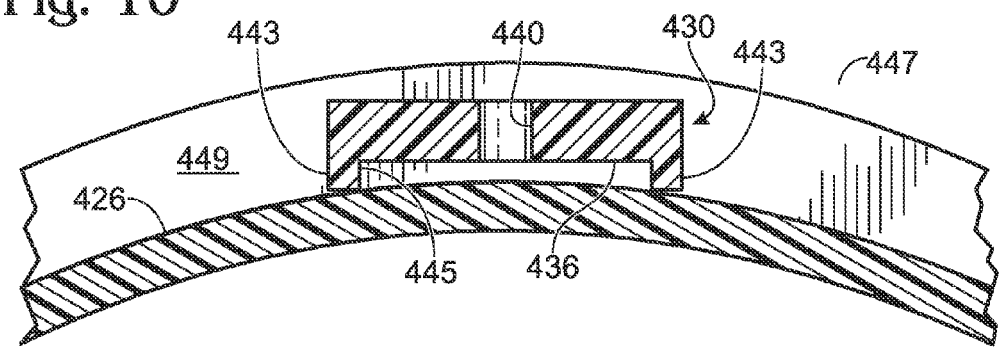
FIG. 10 is a section view taken along line 10-10 of FIG. 9.

FIGS. 9 and 10 show, respectively, a top and cross-section view of an alternative embodiment of a base plate component usable with the assembly of the present invention. The base plate 430 may be formed of any rigid material, such as metal or plastic and has sufficient thickness between its top surface 441 and underside 436 so that the sleeve 440 of this embodiment comprises a smooth-walled aperture, hereafter referred to as the sleeve aperture, for guiding the pilot shaft of the coring tool, as discussed above.

As best shown in FIG. 10, the base plate of this embodiment includes spaced-apart peripheral feet 443 protruding downwardly from the underside 436 of the base plate at opposite sides of the plate. The feet 443 provide contact points for the base plate 430 with the exterior of the pipe sidewall 426. It will be appreciated that the downward protrusion of the feet is sufficient to provide a clearance gap 445 between the pipe sidewall 426 and the underside 436 (between the feet 443) of the base plate. This clearance gap 445 permits the curved pipe sidewall to extend into the gap without contacting the base plate underside 436 so that only the two spaced apart feet 443 actually contact the pipe sidewall to thereby provide a stable engagement of the base plate with that curved sidewall surface.

It is noteworthy that the depth (measured in the vertical direction in FIG. 10) of the gap 445 is selected to be sufficient to enable the base plate feet to stably contact, as just described, the sidewalls of a variety of pipes having different radii.

The base plate 430 of this embodiment is fastened to the pipe sidewall 426 by fasteners as described above in connection with the embodiment of FIG. 1. To this end, through holes, such as shown at 438 (FIG. 9) may be provided in the base plate to accommodate headed fasteners or the like.

Figure 11:
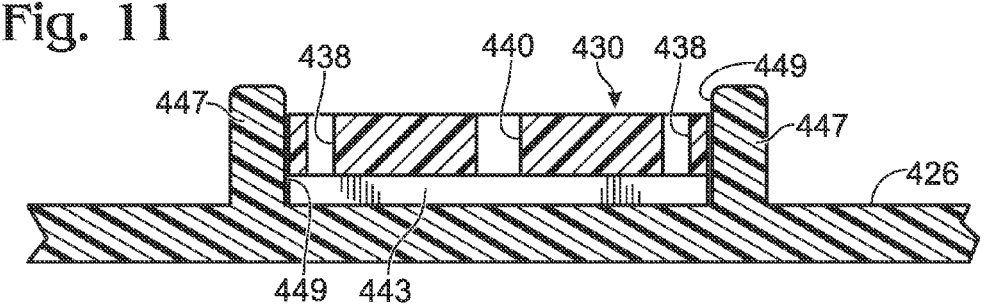
FIG. 11 is a section view taken along line 11-11 of FIG. 9.

With continued reference to FIGS. 9-11, the embodiment of the base plate 430 shown there is adapted to securely engage a pipe sidewall 426 that includes spaced-apart ribs 447 protruding outwardly from the exterior of the sidewall. In this regard, the ribs 447 include facing surfaces 449 between which the base plate 430 is located. The base plate 430 is sized so that it fits between those facing surfaces 449. This type of engagement of the base plate 430 and ribs 447 (that is, fitting between the facing surfaces of the ribs) enables the base plate 430 to move downwardly between the ribs and into secure contact with the surface of the pipe sidewall between the ribs, as best shown in FIGS. 10 and 11.

Alternatively, the base plate 430 can be sized to provide a snug or interference fit between the facing surfaces 449 of the rigs 447, which fit will increase the stability of the base plate attachment to the pipe. It is contemplated that this snug sizing of the base plate could eliminate the need for additional fastening of the base plate to the pipe.

FIG. 12 illustrates a cross sectional view of a base plate 530 that, as an alternative to the approach just described, is configured to engage the protruding spaced apart ribs 547 of the pipe sidewall 526. In this embodiment, the opposing sides 551 of the base plate 530 converge in the downward direction, thereby to define in cross section a wedge-shaped base plate that can be pressed into place (FIG. 12) to bear against the opposing ribs 547. FIG. 12 shows an exaggerated convergence angle or wedge shape of the base plate for understanding. It is understood, however, that the amount of convergence could be more gradual than that shown so that more surface area of the base plate sidewalls 551 would engage the facing surfaces 549 of the ribs. In this regard, the friction between the base plate and contacting ribs may be sufficient for securing the base plate in place adjacent to the pipe sidewall 526, but it is preferred that fasteners, as shown at 538 be employed to supplement the attachment of the base plate.

FIG. 13 is an enlarged, detail view of the contact between a converging side 651 of an alternative embodiment of a base plate 630 that is configured somewhat like that of FIG. 12. In this embodiment, the converging sides 651 of the generally wedge-shaped base plate 630 are formed in a stair-step fashion, thereby to provide several separate contact surfaces 653 at various widths (as measured left-to-right in FIG. 13) of the base plate. As seen in FIG. 13, the stair-step configuration can be sized so that each of the separate contact surfaces 653 will conform to a particular, known spacing between ribs of a particular pipe. This embodiment of the base plate 630 thus engages the ribs 647 by securely resting between and atop the ribs.

Figure 14:
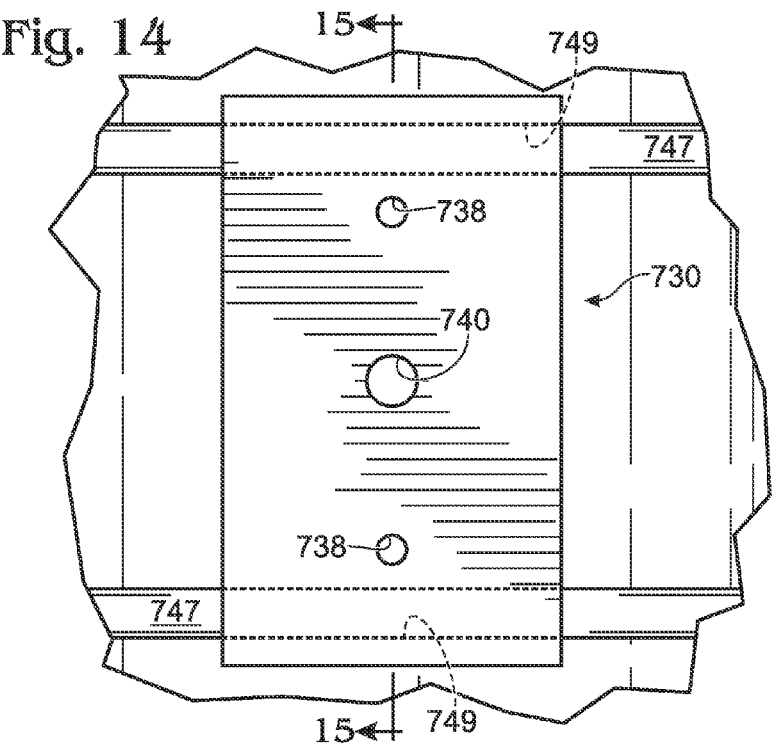
FIG. 14 is a top view of another alternative embodiment of a base plate component of the assembly.

FIGS. 14 and 15 illustrate yet another embodiment of a base plate 730 that is configured to engage the outwardly protruding ribs 747 of a pipe sidewall. In this embodiment, the underside 743 of the base plate 730 is formed with two spaced-apart grooves 749 that correspond in shape to the uppermost parts of the protruding ribs 747. As best shown in FIG. 15, the base plate 730 is thus mounted atop the two ribs. While the drawings of this embodiment show holes 738 for fasteners, it is contemplated that the grooves can be sized in such a way as to securely mount the base plate to the ribs so that additional fasteners are not required.

It is noteworthy that the protruding ribs of pipes as described above are not necessarily discrete annular members. That is, the ribs may also be of a unitary structure, such as a single rib helically wound around the exterior surface of the pipe sidewall. Accordingly, the configurations of the base plates (end surfaces, underside grooves, etc) described above can be modified to conform to and engage ribs of such shapes.

Figure 16:
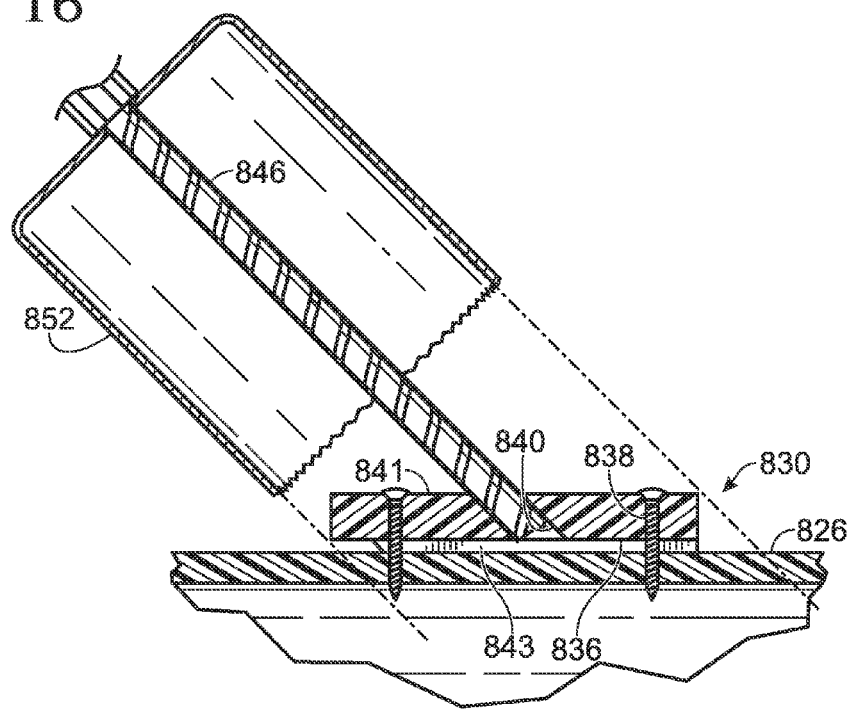
FIG. 16 is a left side view of another alternative embodiment of a base plate component of the assembly.

FIGS. 16-20 illustrate another alternative embodiment of a base plate 830 that is adapted to facilitate formation of a precisely aligned hole in the pipe sidewall 826 where the lateral pipe connection is to be inclined at an angle relative to the mainline pipe. In this embodiment, the assembly includes the base plate 830 generally as described above in connection with the embodiment of FIGS. 9-11. In particular, the base plate 830 has sufficient thickness between its planar top surface 841 and underside 836 so that the sleeve 840 of this embodiment comprises a smooth-walled aperture, hereafter referred to as the sleeve aperture, for guiding the pilot shaft 846 of the coring tool (FIG. 16).

The embodiment of FIGS. 16-20 also includes spaced-apart peripheral feet 843 protruding downwardly from the underside 836 of the base plate at opposite sides of the plate. The feet 843, like those described above in connection with the embodiment of FIGS. 9-11, provide contact points for the base plate 830 with the curved exterior of the pipe surface 826 (FIG. 18).

As shown in FIGS. 17 and 20, the base plate sleeve aperture 840 is arranged so that the central axis "C" is inclined by the desired angle (for example 45 degrees) of intersection between the lateral and mainline pipe. Thus, the central axis "C" of the sleeve aperture 840 is oblique to the planar surface 841 of the base plate.

Once secured in place (as by fasteners 838 shown in FIG. 16) the pilot shaft or bit 846 of the coring tool 852 is received in the sleeve aperture 840. A drill motor (not shown) is operated to rotate the pilot shaft and hole saw 852, and the hole saw is advanced toward the pipe sidewall 826 as the pilot shaft is drilled through the pipe sidewall. The hole saw 852 is advanced by an amount sufficient to complete cut through the pipe and thereby form a hole therein that is aligned with the center line "C" of the sleeve aperture 840 and intersecting the centerline of the pipe.

It is noteworthy that in this embodiment the length (measured left-to-right in FIG. 16 of the base plate) is selected to provide a relatively long, sturdy base plate with correspondingly long feet 843 for secure contact against the pipe sidewall. However, increasing the length of a base plate that is in the shape of a cuboid (that is, a closed box composed of three pairs of rectangular faces placed opposite each other and joined at right angles to each other) increases the minimum diameter of the hole saw that can be used to cut along the oblique angle of the center line "C" of the sleeve aperture since the hole saw must clear the most radially outermost (from axis "C") corners of the base plate to avoid cutting into the plate. In order to reduce the minimum diameter of the hole saw that can be used with the lengthened base plate, therefore, the radially outmost corners of the base plate are beveled to effectively provide clearance for a smaller-diameter hole saw than would otherwise be usable if the base plate retained a cuboid shape (that is, did not have beveled corners).

As best shown in FIGS. 17-20 four corners of the base plate 830 are beveled. One pair of beveled corners 842 are at one end of the base plate, in the top surface 841, and the other pair of beveled corners 844 are at the opposite end of the base plate, in the underside 836 of the base plate. In the preferred embodiment, the corners are beveled into planes, although the corners could be formed as curved surfaces that match the radius of the cylindrical hole saw in use.

While the foregoing description was made in the context of preferred embodiments, it is contemplated that modifications to that embodiment may be made without departure from the invention as claimed. For example, the structure through which the hole is to be cored need not be limited to pipes. The alignment assembly can be used with any such structure, such as manholes, catch basins, vaults, and electrical boxes, for example, made from any of a variety of materials (concrete, fiberglass, etc). If the surface of the structure is substantially flat, the base plate of the alignment assembly would be made flat to conform to that surface.

The invention claimed is:

1. A system for aligning a coring tool relative to a pipe sidewall, the system comprising:
    a hollow, cylindrical hole saw mounted to an arbor that has an elongated pilot shaft centered in the hole saw;
    a base plate attachable to the pipe sidewall and including a first terminal end having a first planar surface, a second terminal end having a second planar surface opposite the first terminal end, and spaced apart peripheral feet protruding from an underside of the base plate to contact the pipe sidewall, wherein each foot extends from the first planar surface to the second planar surface, wherein the first planar surface extends between a first end of a first foot and a first end of a second foot, and the second planar surface extends between a second end of the first foot and a second end of the second foot;
    a sleeve aperture through the base plate and having a bore diameter sized such that it receives the pilot shaft as the hole saw is advanced toward and saws through the pipe sidewall;
    wherein the plate is sized to fit inside the hole saw as the hole saw saws through the pipe sidewall.

2. The system of claim 1 further comprising fastening devices to facilitate attaching the base plate to the pipe sidewall.

3. The system of claim 1 wherein the peripheral feet protrude by an amount sufficient to provide a clearance gap between the spaced apart feet thereby to permit the feet to both simultaneously contact a curved sidewall of the pipe.

4. The system of claim 3 wherein the peripheral feet are sized to permit the curved sidewall of the pipe to extend into the clearance gap without contacting the underside of the base plate.

5. The system of claim 1 wherein the sleeve aperture extends through a thickness of the base plate from a top surface to the underside of the base plate.

6. The system of claim 1 wherein the sleeve aperture is a smooth-walled aperture.

7. A system for aligning a coring tool relative to a pipe sidewall, wherein the pipe sidewall includes ribs protruding outwardly therefrom, the system comprising:
    a hollow, cylindrical hole saw mounted to an arbor that has an elongated pilot shaft centered in the hole saw;
    a base plate attachable to the pipe sidewall, wherein the base plate includes a first terminal end having a first planar surface and a second terminal end having a second planar surface, wherein the first planar surface and the second planar surface of the base plate are configured to contact the ribs of the pipe sidewall, wherein the base plate includes a first side and a second side opposite the first side, wherein a first single foot extends along the first side of the base plate, and a second single foot extends along the second side of the base plate, wherein the first planar surface extends between a first end of the first single foot and a first end of the second single foot, and the second planar surface extends between a second end of the first single foot and a second end of the second single foot;
    a sleeve aperture through the base plate and having a bore diameter sized such that it receives the pilot shaft as the hole saw is advanced toward and saws through the pipe sidewall;
    wherein the plate is sized to fit inside the hole saw as the hole saw saws through the pipe sidewall.

8. The system of claim 7, wherein the ribs include facing surfaces, and wherein the base plate is configured to engage the facing surfaces.

9. The system of claim 8 wherein the base plate is sized to be received between the facing surfaces of the ribs.

10. The system of claim 8 wherein the base plate is configured to provide an interference fit between the facing surfaces of the ribs.

11. The system of claim 7 wherein each foot protrudes from an underside of the base plate to contact the pipe sidewall.

12. The system of claim 11 wherein each foot protrudes by an amount sufficient to provide a clearance gap between the feet thereby to permit the feet to contact a curved sidewall of the pipe.

13. The system of claim 12 wherein the ribs include facing surfaces, and wherein each foot is configured to contact the facing surfaces of the ribs and securely contact the surface of the pipe sidewall.

14. The system of claim 7 wherein the sleeve aperture extends through a thickness of the base plate from a top surface to the underside of the base plate.

15. A system for aligning a coring tool relative to a pipe sidewall, the system comprising:
    a hollow, cylindrical hole saw mounted to an arbor that has an elongated pilot shaft centered in the hole saw;
    a base plate attachable to the pipe sidewall and including a first terminal end having a first planar surface, a second terminal end having a second planar surface opposite the first terminal end, and spaced apart peripheral feet protruding from an underside of the base plate to contact the pipe sidewall, wherein each foot extends from the first planar surface to the second planar surface, wherein the first planar surface extends between a first end of a first foot and a first end of a second foot, and the second planar surface extends between a second end of the first foot and a second end of the second foot;
    a sleeve aperture through the base plate and having a bore diameter sized such that it receives the pilot shaft as the hole saw is advanced toward and saws through the pipe sidewall;
    wherein the peripheral feet protrude by an amount sufficient to provide a clearance gap between the spaced apart feet to receive a curved sidewall of the pipe.

16. The system of claim 15, wherein the pipe sidewall includes ribs protruding outwardly therefrom.

17. The system of claim 16, wherein the ribs include facing surfaces, and wherein the base plate is positioned between the facing surfaces.

18. The system of claim 17, wherein the base plate is configured to engage the facing surfaces of the ribs to enable the base plate to move downwardly between the ribs and into secure contact with the surface of the side of the pipe between the ribs.

19. The system of claim 15, wherein the peripheral feet simultaneously contact the sidewall of the pipe.

20. The system of claim 15, wherein the feet are sized to provide a gap sufficient to receive the sidewalls of pipes having different radii.

* * * * *

UNITED STATES PATENT AND TRADEMARK OFFICE
CERTIFICATE OF CORRECTION

PATENT NO. : 8,770,897 B2  
APPLICATION NO. : 12/612027  
DATED : July 8, 2014  
INVENTOR(S) : Frank P. Martin It is certified that error appears in the above-identified patent and that said Letters Patent is hereby corrected as shown below:

On the title page, in the (*) Notice section, "This patent is subject to a terminal disclaimer." should be deleted.

Signed and Sealed this  
Third Day of February, 2015

Michelle K. Lee  
*Deputy Director of the United States Patent and Trademark Office*